Fig. 1.

United States Patent Office 3,423,442
Patented Jan. 21, 1969

3,423,442
PROCESS AND APPARATUS FOR IMPROVING FATS
Friedrich Eichler, Kempten, Allgau, Germany, Paulus Johannes Seip, Zwijndrecht, Netherlands, and Peter Czedik-Eysenberg, Vienna, Rodaun, Austria, assignors to Lever Brothers Company, New York, N.Y., a corporation of Maine
Filed Mar. 19, 1965, Ser. No. 441,378
Claims priority, application Great Britain, Mar. 20, 1964, 11,861/64
U.S. Cl. 260—420      10 Claims
Int. Cl. C11b *3/00*

ABSTRACT OF THE DISCLOSURE

A liquid phase process for refining glyceride oils is described in which the oil in liquid condition is treated with an aqueous liquid treating agent in a bed of chemically inert packing material of uniform depth under conditions providing numerous interfaces between the two liquids.

---

This invention relates to the refining of glyceride oils by means of an aqueous liquid.

Glyceride oils, especially crude natural oils, commonly contain small proportions of substances other than fatty acid triglycerides including substances which have a detrimental influence on taste and colour. The term "refining" is used herein to cover processes for the removal of such components. The refining processes of most importance in this invention are directed to removal of free fatty acid from the oil by neutralisation with aqueous alkali followed by removal of the soap so formed at the interface between the oil and aqueous liquid by that liquid. Such processes may be classed under the term "alkali refining." Other refining processes of interest according to this invention include the washing out of occluded soap from an oil that has been subjected to such an alkali refining process and the desliming of oils, in which so-called mucilage is removed by treatment with suitable aqueous liquids. Mucilage is a collective noun for substances which are dissolved in the crude oils but which are of a hydrophilic nature. The substances involved are mainly phospholipids. All these processes involve treating the oil with an aqueous liquid under such conditions that a system is formed in which one of the said liquids forms an unstable dispersion in the other and contaminating substances are removed from the interface. By virtue of containing both hydrophilic and hydrophobic groups, these contaminating substances tend to cause undesired emulsification in contact with aqueous media. The present invention provides a process of this kind which is continuous and can be effected with little undesired emulsification and with high efficiency.

The invention provides a liquid phase process for refining glyceride oils, of the kind in which the oil in liquid condition is treated with an aqueous liquid treating agent under conditions providing numerous interfaces between the two liquids and contaminants are extracted by the aqueous liquid at said interfaces, characterised in that the treatment is effected continuously in a bed of chemically inert packing material by causing each of said liquids to make random contacts with the other while flowing along tortuous paths through said bed and subsequently separating the oil and aqueous liquids by virtue of their different specific gravities.

The present invention is particularly advantageous for the alkali refining of glyceride oils. (In this specification the term "glyceride oils" is used to include fatty acid glycerides which are normally solid as well as those which are normally liquid.)

The invention is also applicable to other refining processes, including the washing of traces of soap from the oil after neutralisation, and desliming, especially post-desliming, that is, desliming after neutralisation. During neutralisation the greater part of the mucilage, if present in the glyceride oil, is removed. In some cases so much mucilage remains in the oil that a post-desliming is necessary. Examples of such oils are soyabean oil, rapeseed oil, cottonseed oil, linseed oil and groundnut oil. Post-desliming can be done by treating the oil with a solution of alkaline sodium silicate. The flocculation of the hydrated silica causes preferential absorption of the mucilage in the alkaline solution and a separation of this solution and oil.

It is an advantage of the present process that it can be carried out continuously and that the oil losses during the refining are considerably reduced. It is a further advantage that the apparatus for carrying out the process of the invention is a compact one and needs relatively little space to arrive at suitable throughputs. The bed is filled with one of the liquids and the other liquid is caused to flow through the bed to make random contact with the first while flowing along tortuous paths through said bed. It is preferred to pass the oil through the bed filled with the aqueous solution, the oil stream entering through the bottom of the bed and rising in the bed by virtue of its lower density. The oil phase, during its passage through the packed bed makes random contacts with the aqueous treating liquid while flowing along tortuous paths, which results in a rapid extraction of contaminating substances in the oil, after which the oil phase is collected above the packed bed and drawn off. The efficient removal of the free fatty acids or other contaminants from the oil by the aqueous phase is bound up with the fact that the interface of the oil and the lye is continually renewed, which promotes the transfer of free fatty acids and other matter from the oil into the aqueous phase without disturbing secondary effects.

The packed bed consists of a number of layers of chemically inert packing bodies piled upon one another, which may possess different shapes. Packing material, in the form of beads, saddles or rings or the like may be used. The dimensions of the packing material have to be chosen according to the conditions of the process. In general the diameter of the packing material, when beads are used, may be between 5 and 50 mm., the range between 10 to 40 mm. and particularly between 15 and 30 mm. being preferred. It is important that enough free space is available in the bed for the oil and aqueous solution to pass through it. The free space is different in each type of packing. Thus, for beads it can be calculated that the free space is from 40–45%, whereas for saddles the free space is about 70–80%. In general it can be stated that the free space in the bed must range between 30 and 90% to obtain good results. The height of the bed of packing material depends inter alia on the free fatty acid content of the crude oil and the processing conditions, such as temperature, alkali concentration, alkali excess and throughput. Heights ranging between 10 cm. to 200 cm., for instance, are possible. In general the manner in which the oil is divided at the entrance of the bed of packed material is not very critical, provided that the oil is more or less spread out over the whole cross-section of the packed bed.

The process of the invention will now be specifically described in more detail for application to the neutralisation of oils by contacting them with an aqueous alkaline solution. The conditions in this type of process should be such that the contact time between the oil and the alkali in the bed of filling material suffices to provide a substantially completely neutralized oil. Although for each kind of oil differences exist, this time usually need not be longer than one minute and sometimes it may be considerably shorter. For each kind of oil the height of the bed of inert material is determined by the time necessary to obtain the desired neutralizing effect and the speed and direction of flow of the two liquid phases through the bed. Thus with beds having a height between 10 and 100 cm. and a diameter of about 1 m., throughputs may be obtained from 1 to 4 tons per m.$^2$ per hour. The packing bodies are made conveniently from inert materials, such as glass, ceramic material preferably glazed, a metal such as stainless steel that will not affect the oil, or an inert plastic, especialy one of the hydrocarbon polymer class, such as polypropylene, poyethylene or polystyrene. The packing bodies may be made of a lipophilic substance, or with a surface which is made lipophilic, wich has the effect that the oil passes the bed in the form of thin streams, the surfaces of which are constantly renewed. When using lipophilic packing material it is preferred to have much free space in the bed because the tendency of the oil to obstruct the flow of aqueous solution is greater with such materials.

It is possible to use more than one bed of inert material or to recirculate the oil after its passage through the bed. These variations, however, are not necessary, since a fully satisfactory result can be obtained in one bed by proper choice of the process conditions.

The alkaline solution may flow counter-currently as well as concurrently with the oil, both types giving good results. Although in general it is preferred to carry out the process so that the bed is initially filled with the aqueous phase, it is possible to carry out the process so that the bed is filled initially with oil. In the latter case, when the apparatus is filled with oil, the process is started by introducing the aqueous alkaline solution just above the packed bed. Just below the bed the divided alkaline phase coalesces to a clear layer which is drawn off.

The process of the invention is applicable to various kinds of crude oils and even when the content of free fatty acid is high a satisfactory low final free fatty acid content can be reached. Although for most kinds of oil a definite improvement in colour is obtained, it is desirable to subject them to the usual bleaching treatment. However, some oils, such for example as coconut oil, are both deacidified and bleached to a greater or less extent in the process of the invention.

It is of advantage to use sodium hydroxide as the alkali, but other alkaline agents may also be used. In general an alkaline solution with a concentration of 0.05 to 2.0 N is applied, the range of 0.1 to 1.2 N being preferred. The optimum concentration of the alkaline solution may differ for each oil and at higher temperatures higher concentrations may be applied. As in the usual neutralization processes, it is advantageous to use a slight excess of alkali, say 10 to 20%.

The process must be carried out so that the oil streams, after they have passed through the bed, that is in the preferred process where the oil constitutes the dispersed phase, can easily coalesce in a short time over the bed to form a pool of neutralized oil. When the process conditions are correctly chosen it has been observed that the divided oil, after leaving the bed of packings forms oil patches at the upper surface of the alkaline solution and that these grow into larger patches which eventually coalesce. To further the gradual coalescence of the oil patches the flow velocity in the collecting zone may be slowed down by choosing the diameter of this zone greater than that of the reaction zone. Further it may be useful to remove beforehand all substances present in the crude oil or in the alkaline solution which may promote emulsification, such as occluded or dissolved air or impurities floating in the oil. This may be done by filtering and degassing the crude oil as well as the alkali before they are introduced into the column. After the neutralization step the oil is collected and may be washed by means of hot water with or without an electrolyte, such as salt. The washing step may be effected prior to the complete coalescence of the oil but after it has passed through the bed, for instance by passing it through a further packed bed directly above the first bed together with hot water with or without electrolyte.

The latter combination has advantages in that less floor space and less auxiliary equipment is required than when using a separate washing column. The packed bed used in the washing treatment is subjected to the same conditions as the packed bed in the neutralization step. Owing to the different relation of the surface tensions of the oil and the water phase in the washing column, in general the oil is divided into a more coarse form than during the neutralization. The soap content of the water phase is the washing column therefore has to be controlled in such a way that the oil division does not become too large, which would affect the transfer of soap to the water phase. The water phase is suitably introduced at the top of the second packed bed and drawn off at the bottom. The divided oil substantially free from soap and fatty acid easily coalesces over the second bed and is collected as neutral oil. This modification has advantages in case oils are neutralised which do not coalesce easily, or when emulsions are formed, for whatever reason, during the process. These emulsions, if they occur, are easily broken by the washing treatment, which means that by combining the deacidification and washing step in one column, the maximum throughput can be considerably increased. The combination is safer in its operation in so far as the formation of emulsions, which is not excluded when working under uncontrolled process conditions, does not affect the capacity of the process and the obtaining of neutral oil with a low final free fatty acid content.

The temperature during the neutralization is preferably chosen not less than 60° C. to avoid solid soap formation or high viscosity of the oil. In some cases the tendency to emulsion formation is rather high and this tendency can be strongly reduced by increasing the temperature. When the process is carried out at high temperature up to 160° C. and even higher favourable results can be obtained, especially for oils which have a tendency to form emulsions during refining owing to their nature. Also it is possible by adjusting the temperature to choose the most favourable process conditions with other process variables, such as alkali concentration, type of neutralizing agent as well as the presence of electrolytes during the refining treatment. It has been observed that the neutralization process is almost completely controlled by what happens at the oil-lye interface. At this interface local differences in interfacial tension occur during the transfer of free fatty acids from the oil to the aqueous phase. These differences in interfacial tension cause currents in the immediate vicinity of the interface. In general these currents are shown by interfacial turbulence. These currents may become so violent that the interface becomes unstable and that protuberances may be formed at the surface of the oil and from these protuberances oil droplets may be struck off and emulsified. In research on this phenomenon we have found that the emulsified oil droplets are extremely small so that they will not settle even in a very strong gravity field. The interfacial turbulence and the so-called spontaneous emulsification are very much dependent on the processing conditions as well as on the type of oil used. Although great interactions occur between the factors which govern the process, such as nature of the alkaline reagent, electrolyte concentration, type of oil and type of free fatty acid in the oil as well as the free fatty acid content of the oil, it could be established that in many cases the optimum conditions for neutralization, according to the process of the invention, were to be found in general at relatively high temperatures.

The temperature during alkali refining according to the invention may be chosen in the range of 60° C. up to 160° C. and even higher. The upper limit is not very critical but is limited by the increasing hydrolysis reaction at these temperatures.

This modification is advantageous for oils having a very high free fatty acid content or oils which are known to be rather difficult to neutralize, but it is to be understood that the effects for each type of oil are different in degree and that also the temperatures which give the best results may vary. It will be evident that the process may have to be carried out at superatmospheric pressure, in order to prevent evaporation of the aqueous phase when working at a relatively high temperature. This pressure may be imparted by an inert gas, like nitrogen, the total pressure being well above the saturated vapour pressure of the water at the treating temperature. The total pressures, which are the sum of the pressure of the inert gas and the vapour pressure, are generally in the range of 3 to 10 atm.

The difference in the behaviour of oils during neutralization can best be characterized by the type of fatty acid which is predominantly present in the triglycerides of the oil. There is a tendency for the refining losses to decrease with decreasing chain lengths of the fatty acid which is mainly present in the oil. These chain lengths broadly vary between 6 and 24 carbon atoms. Whether or not the fatty acids possess unsaturated bonds is also important. Oils which contain, for instance, $C_{18}$ fatty acids with 1 or 2 unsaturated bonds are in general neutralised more efficiently by the process of the invention than oils containing predominantly $C_{18}$ saturated fatty acids. At higher chain length of these fatty acids the losses due to spontaneous emulsification become appreciably greater. In particular oils containing fatty acids with a high chain length are more efficiently neutralized when raising the temperatures to substantially over 100° C. Consequently the classification of the oils as to their behaviour during neutralization is broadly as follows:

(1) Oils having a predominant amount of free fatty acids up to a chain length of 14 carbon atoms, of which class coconut oil, palmkernel oil and Babassu nut oil are representatives.

(2) Oils containing predominantly fatty acids with a chain length of 16 carbon atoms or more, which contain a substantial amount of saturated fatty acids. Representatives of this class are palm oil, hardened fats and oils, tallow and cocoabutter, Borneo tallow, illipe butter, lard and tallow. (These oils in general are apt to give rise to difficulties during refining because they do not easily coalesce, and do readily undergo spontaneous emulsification.)

(3) Vegetable oils containing predominantly fatty acids with a chain length of 16 carbon atoms and higher, containing unsaturated bonds, of which class cottonseed oil, soybean oil, groundnut, oil, olive oil, sunflower oil, safflower oil, sesame oil, linseed oil, rapeseed oil and mustard seed oil are representatives.

It is to be understood that this is a very general classification and that many oils take an intermediate position especially between the last two groups.

For the first class of oils, which may contain a free fatty acid content up to 5%, the temperature may be chosen in the range of 60–100° C., the alkaline concentration depending on the acidity of the oil but generally being in the range of 0.2 to 1.2 N.

For the second class of oils the optimum temperature is about 160° C., for oils containing a high amount, up to 5%, of free fatty acids, the alkaline concentration depending again on acidity but being generally in the range of 0.2 to 1.2 N.

For oils containing a smaller amount of free fatty acids, say lower than 1%, the temperature may be somewhat lower, the optimum temperature being about 140° C. The alkaline concentration may range from 0.1 to 0.4 N.

For the third class of oils a somewhat lower temperature can be chosen, e.g., about 130° C., whereas the alkaline concentration is preferably from 0.2 to 0.8 N for oils containing a high amount of free fatty acids and 0.1 to 0.4 N for oils containing less than 1% free fatty acids.

As indicated above, the process of the invention also comprises the washing out of occluded soap from an oil that has been subjected to neutralisation, and the post-desliming of oil in which substances, such as mucilage, are removed by treatment with suitable aqueous liquids.

For edible purposes it is necessary that the soap content of the oil is brought below 0.1%. This can be done by washing the oil with hot water. The process of the invention provides a process for washing oils free from soap in which the principles described above for the neutralisation of oil are valid. The oil, being the lighter phase, is suitably contacted in dispersed state with the hot water solution (which may contain electrolytes) in a packed bed. The oil is introduced at the bottom of the packed bed and flows in random contacts through the water phase along a tortuous path through the bed. The removal of soap from the oil takes place without any chemical reaction so that the process, unlike neutralisation, is purely physical. Owing to the differences in interfacial tension between oil and water in comparison with oil and alkali, the oil flowing through the bed is in general dispersed in a more coarse form than in neutralisation.

In order to further the efficient removal of soap from the oil it is useful to adjust the amount of wash-water necessary to obtain a fine division of the oil phase.

Electrolytes, such as salt, may be present, and it is preferred to have the water phase slightly alkaline.

For this process it is generally not necessary to raise the temperature above 100° C.

In desliming the aqueous medium conveniently consists of a solution of alkaline sodium silicate. This solution may be made, for example, by adding a water-glass solution of about 30–40° Bé to a solution of sodium carbonate with a strength of about 10–30%.

The process is carried out in the same way as already described for the alkali refining process.

The refining process of the invention is also applicable to crude oil in the form of a miscella. When oil seeds are extracted with solvents, a so-called miscella is obtained which consists of oil dissolved in the solvent. In general the miscella is evaporated and then treated with steam to remove the last traces of solvent. Thereafter the oil is refined in the usual way. According to the invention the neutralisation process may be carried out on the miscella in the packed column. Various solvents may be used for the extraction of oil seeds, but it has been found particularly suitable to use commercial hexane in a 50–60% solution. Moreover it has been found advantageous to deslime the oil in the miscella before it is subjected to the neutralisation process according to the invention. It has been found that a content of 0.05–0.6% by weight of lecithin is permissible in the oil without adversely affecting the neutralisation process and may even be advantageous.

Figure 1:
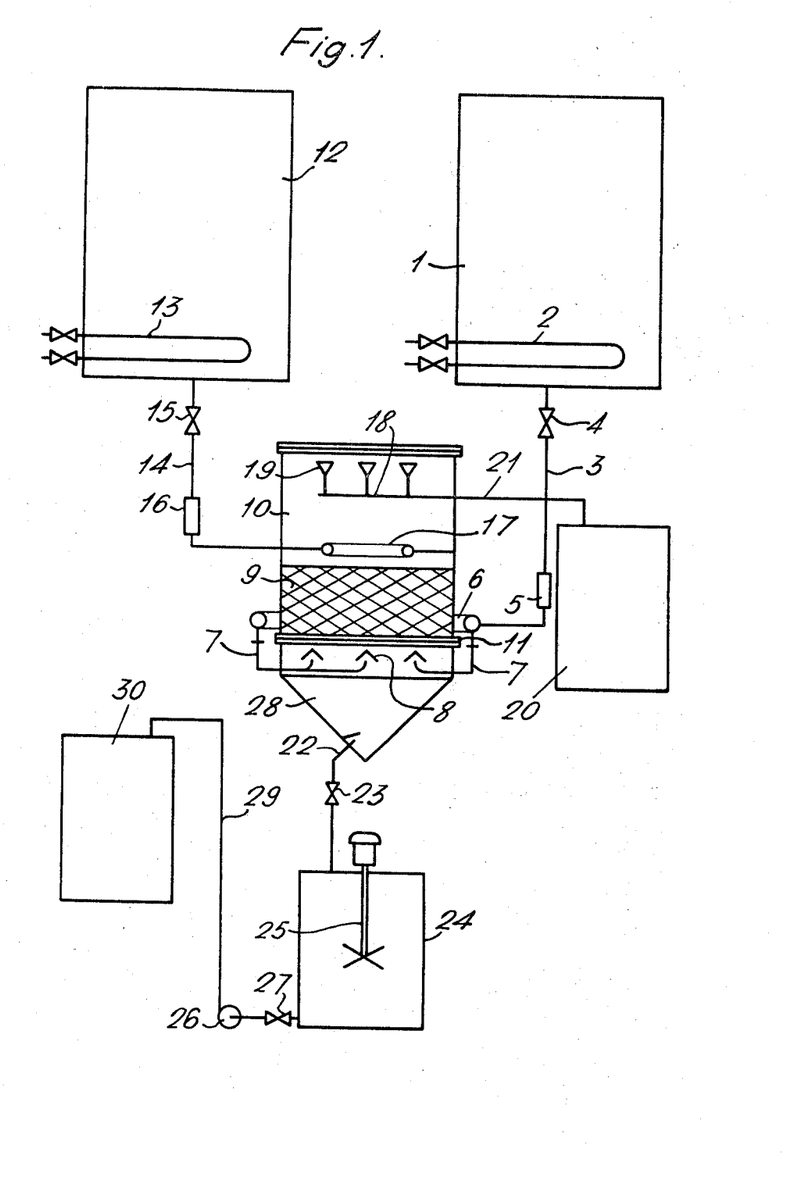

FIGURE 1 of the accompanying drawings is a flowsheet of a process according to the invention in which oil is treated countercurrently with the aqueous solution, the oil being in dispersed condition. The process will be described with particular reference to neutralisation of oils but its application in others of the kind referred to above will be evident. The oil is stored in vessel 1 and is heated by heating coil 2. The oil is transported through pipe 3 containing a valve 4 and a rotameter 5 to a ring pipe 6, from which it enters column 10 via a number of pipes 7. The outlets of pipes 7 are regularly distributed over the cross-section of the column and the oil flows via hollow cones 8, which may be provided with holes, into the column 10 just beneath the bed of inert fillings 9. This bed is supported on a grid 11.

The alkali is stored in vessel 12 which may be heated by heating coil 13. Through pipe 14 containing a valve 15 and a rotameter 16 the alkali flows into the column 10 just above the bed 9, where it enters a hollow ring pipe 17. This pipe is provided with a number of holes at its upper surface, through which the alkali flows out over the upper surface of the bed.

The bed 9 may be composed of porcelain balls or saddles or rings. The oil, which flows in divided form through the bed, enters an empty zone 18 of the column where it separates from the alkali and coalesces. The oil rising in the column in the empty space 18 leaves the column through the overflows 19 and is collected into vessel 20, which it enters through a pipe 21. The spent alkali after having passed the bed enters the conical zone 28 of the column beneath the oil inlet and leaves the column through outlet pipe 22 provided with a valve 23 and enters the collecting vessel 24. In order to prevent setting of the soap solution, the vessel 24 is provided with a stirring device 25. The soap solution is further transported by pump 26 via valve 27 through pipe 29 into vessel 30.

Apparatus according to the invention is shown by way of example in FIGURES 2 to 7 of the drawings, wherein.

Figures 2, 5:
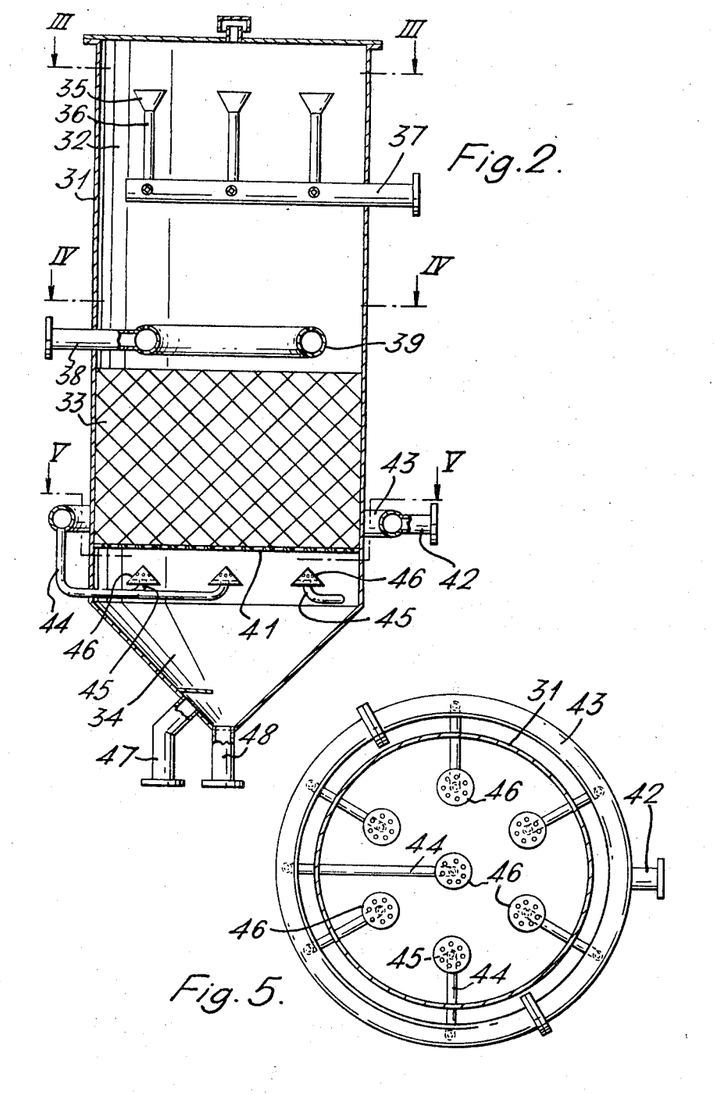
FIGURE 2 is a longitudinal cross-section of an apparatus for countercurrently treating glyceride oils.
FIGURE 5 is a cross-sectional plan view along the line V—V of FIGURE 2, showing the oil inlet.
Figures 3, 4, 7:
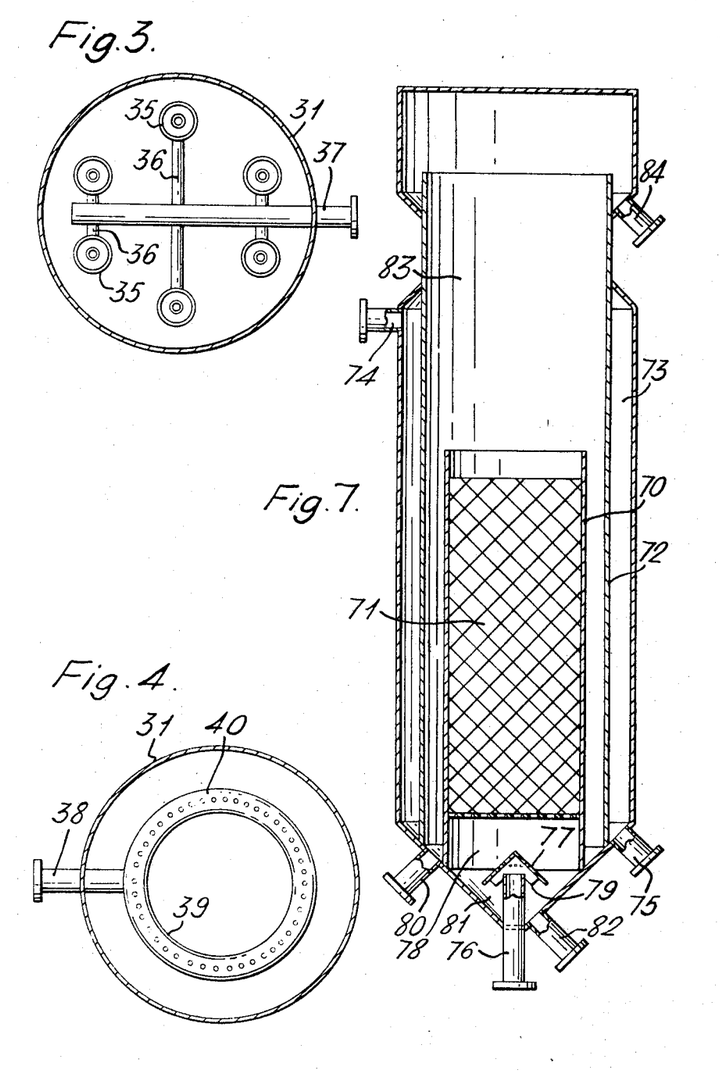
FIGURE 3 is a cross-sectional plan view along the line III—III of FIGURE 2, showing the oil outlet.
FIGURE 4 is a cross-sectional plan view along the line IV—IV of FIGURE 2, showing the inlet of the aqueous medium.
FIGURE 7 is a longitudinal cross-sectional view of an apparatus specially suitable for treating glyceride oils in co-current flow with the aqueous medium.

In FIGURE 2 a column 31 is shown, comprising an empty space 32 in which the oil coalesces after the contact with the aqueous solution, a packed bed 33 in which the treatment takes place, and an empty conical zone 34 where the spent aqueous solution assemblies. The oil leaves the column via overflows 35 from which it flows through pipes 36 to the outlet pipe 37. From FIGURE 3 it can be seen that six overflows are present. The aqueous solution is introduced into the column through inlet pipe 38 just above the bed 33. FIGURE 4 shows the inlet pipe 38 connected with a ring pipe 39 which is provided at its upper part with a number of small holes 40, through which the liquid passes into the column and is regularly distributed over the bed. The bed of inert material is supported by a grid 41. The oil is introduced into the column via inlet 42 which is connected with a ring pipe 43, from whence it passes into pipes 44 having their outlets 45 just below the packed bed. Over these outlets hollow cones 46 are located which extend downwards to a small distance below outlet 45. The oil flows from under the cones upwards, as well as through small holes (not shown) regularly distributed over the surfaces of the cones. Consequently the oil is regularly spread out into discrete streams distributed over the cross-section of the bed.

In FIGURE 5 six outlets 45 are shown, provided with cones 46 and a seventh outlet in the centre. In a typical embodiment the column has a cross-section of 110 units and a bed height of 60 units, the height of the upper empty space is 100 units and the height of the lower zone where the spent aqueous liquid is collected is 80 units.

Figure 6:
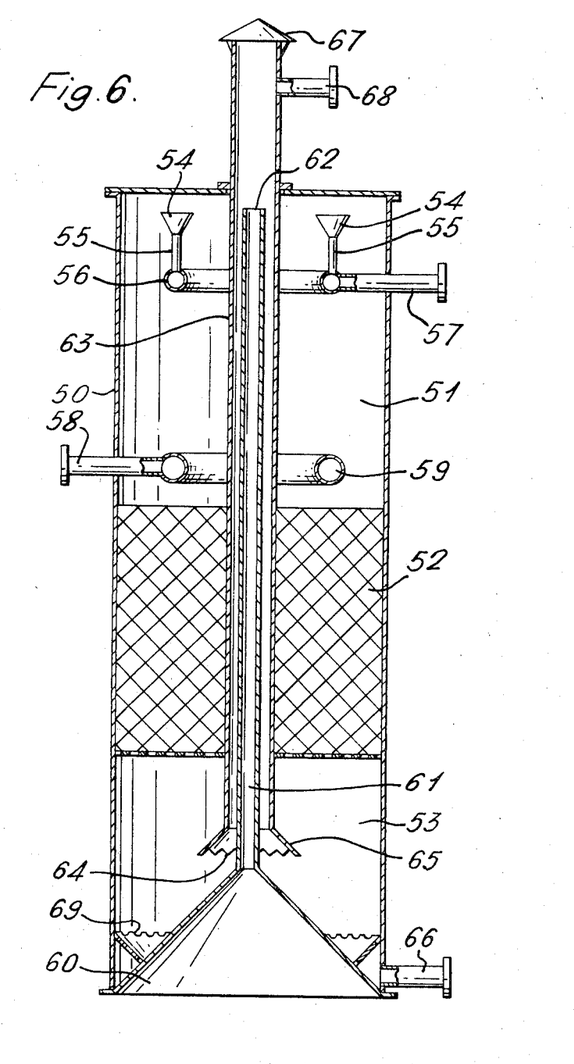
FIGURE 6 is a longitudinal cross-sectional view of an apparatus specially suitable for countercurrently washing glyceride oil.

In FIGURE 6 an apparatus according to the invention which is specially suitable for the washing of oils is shown. Column 50 comprises an empty space 51 at the top, a packed bed 52 and a second empty space 53 at the bottom. The treated oil is drawn off through overflows 54, via pipe 55, passing through a ring pipe 56 to outlet 57, where it leaves the column. The aqueous liquid is introduced into the column just above the bed through inlet 58 which is connected with a ring pipe 59 provided over its upper surface with a number of regularly spaced small holes. The oil inlet in the hollow zone 53 is different from the inlets already described and constructed in such a way that the apparatus can be placed on top of a neutralising column according to the invention. The neutralised oil is not drawn off via overflows, but is led to the cone-shaped empty space 60, where it enters a column constructed as shown in FIGURE 6. The oil rises through the central pipe 61 which it leaves at the upper end 62 and then enters the annular space between the pipe 61 and a concentric but larger pipe 63. The oil then flows down into this annular space and leaves at the lower end which is cone-shaped. The oil flows through holes (not shown) in the surface of the cone 65 and rises from under the base 64 of the cone, which is serrated. The oil then flows upwards through the bed countercurrently to the aqueous liquid introduced through circular inlet 59. The spent aqueous liquid after having passed through the bed, collects in the empty zone 53, from whence it leaves the column through outlet 66 after passing through holes 69 in a strengthening ring. The pipe 63 is closed at the top with a cap 67 and can be connected with the atmosphere via outlet 68. The apparatus has the advantage that when it is attached immediately above a neutralising column according to the invention, no danger exists of washing water penetrating into the lower column. In a typical embodiment, the dimensions of the apparatus are: height of the bed 40 units, height of the upper empty zone 60 units, height of the conical zone at the bottom of the column 15 units, diameter of central pipe of 2 units, outer concentric pipe 5 units, and of 40 units, the oil outlet being about 15 units below the bed and the inlet for the aqueous medium about 7 units above the bed.

The embodiment shown in FIGURE 7 can be used for co-current flow of the oil and the aqueous liquid. The column consists of two cylinders, one being fitted concentrically within the other. The inner cylinder 70 contains the filling material 71, e.g. ceramic balls, and provides the treating zone reaction. Cylinder 70 is surrounded by cylinder 72 having a slightly larger diameter. Cylinder 72 is surrounded by a heating mantle 73 containing an inlet 74 and an outlet 75 for the heating medium. The oil inlet 76 is at the bottom part of the inner cylinder and ends in a cone 77, the oil flowing from the inlet 76 into and then out from under this cone into space 78. This cone is formed with serrations 79. The inlet 82 for the aqueous liquid is arranged at the bottom of the column in the conical part 81 adjacent to the oil inlet assembly represented by 76, 79 and 77. The bed of inert filling material ends a small distance under the upper part of the inner cylinder 70. The outlet 80 for the spent aqueous liquid is fitted into the bottom of the annular space between cylinders 70 and 72. The oil and aqueous liquid rise in the inner cylinder 70 through the packing material. At the top of this inner cylinder the spent aqueous solution enters the annular space, flows downwards and is drained off through outlet 80. The oil rises until it flows over the upper edge of cylinder 70, where it reaches the collecting zone 83 and is drawn off via the outlet 84.

In the operation of this apparatus as described above, the aqueous solution flows concurrently with the oil, but when the functions of the outlet 80 and the inlet 82 are reversed, the aqueous solution can be made to flow countercurrently with the oil. The aqueous solution then entering the column via pipe 80 (which is now the inlet) rises in the annular space between cylinders 70 and 72, flows into the cylinder and passes downwards through the packed bed 71 whence it is drained off via pipe 82 which is now the outlet.

The following examples illustrate the invention.

Example 1

Hardened whale-oil was neutralised in a glass apparatus constructed on the same principle as that of FIGURES 2 to 5, the length of the column being 50 cms. and the diameter 7.5 cms., the bed of filling material being 20 cms. of height and composed of ceramic beads being 1 cm. in diameter. The glass column was surrounded by a heating jacket, by which the temperature could be controlled.

The crude oil was introduced into the lower part of the column, flowed upwards through the bed of beads and coalesced in the upper zone, whence it left the apparatus through the overflow. The lye was introduced above the bed and exhausted lye and soap left the apparatus through the outlet. The column was filled with 0.2 N sodium hydroxide containing 1% sodium chloride at a temperature of 75° C. Eight charges of hardened whale-oil of 1.5 to 1.8 kg. each were fed through the column, the rate of flow varying from 3.7 to 6.9 l./hr. The hardened whale-oil had a free fatty acid content of 0.70% and a volatile matter content of 0.69%. The average values for the refined whale-oil were: free fatty acid content 0.09%, soap content 0.01% and neutralising factor 1.18. The neutralising factor was determined as follows:

$$\frac{\text{weight of (crude oil-volatile)}-\text{weight of (neutralised oil-water-soap)}}{\text{weight of free fatty acid in crude oil-weight of free fatty acid in neutralised oil}}$$

Example 2

The process was carried out as in Example 1. Coconut oil was neutralised, having an original free fatty acid content of 1.70% and a volatile matter content of 0.52% at a temperature of 75° C.; 0.4 N lye was used, containing 0.8% sodium chloride. The rate of flow varied from 5.5 to 6.0 l./hr. The average values for the neutralised oil were: free fatty acid content 0.09%, soap content 0.01% and neutralising factor 1.06.

Example 3

In order to investigate the influence of the height of the bed of beads on the neutralising effect, coconut oil with a free fatty acid content of 5.20% was neutralised and the height of the bed of beads in the apparatus of Example 1 was varied. The height of the lye column in the apparatus was kept unchanged at 35 cm. during the whole series of trials. Lye of 0.4 N containing 1% of sodium chloride was used at a temperature of 75° C. The column was filled with lye and the oil was put through until half of the lye was neutralised. After that a lye counter-flow of 0.8 l./kg. oil was maintained. The height of the packed column varied from 0 to 30 beads with a diameter of 10 mm. From Table I it can be seen that the neutralising effect is dependent on the height of the column of beads.

Example 4

Trials were carried out in a pilot plant apparatus constructed as shown in FIGURES 2 to 5 of the drawings, the height of the column being 1.50 m. and its diameter 300 mm.

The height of the bed was 400 mm., and was formed of 30 kg. of ceramic beads having a diameter of 10 mm. The volume of the upper resting zone was 35 l. Throughputs of more than 100 kg./hr., or calculated on the cross-section of the column of more than 1.41 tons/m.²/hr., were obtained. Crude coconut oil with a free fatty acid content of 3–4% was treated with 0.4 to 1.2 N lye.

An excess of lye over that theoretically necessary of about 30% was used. The oil introduced was heated to 100° C. and the lye in the column to 90° C., the temperature in the column being between 75 and 80° C. The optimum throughput appeared to be about 240 kg./hr. Numerous trials were carried out, which showed that the results were independent of the throughput up to an optimal value, determined by the dimensions of the apparatus, above which value stable emulsion-formation began to occur and in consequence refining factors tended to become less satisfactory.

The average free fatty acid content in the neutralised oil was from 0.04 to 0.08%. The soap content in the neutralised oil was about 0.01 to 0.08%, and slightly increased at higher throughputs, as did the water content. The neutralisation factor was 1.09 to 1.26 and the fatty acid content in the acid oil recovered from the soap was from 86–97%.

Before bleaching the colour of the neutralised oil was indicated by iodine scale numbers. This is the colour of a solution of potassium iodide in water expressed in mg./100 ml. solution.

Example 5

Coconut oil was refined in a glass apparatus of the construction shown in the drawings. The length of the column was 80 cms., its diameter in the reaction zone was 7 cms., and in the collecting zone which had a height of 25 cms., the diameter was 10 cms. The reaction zone was filled with Berl saddles of maximum dimension 10 to 16 mm. The column was charged with 2.5 l. of 0.8 N lye, the lye surface during the process being kept about 5 cm. above the saddles. The oil was introduced at the bottom of the apparatus about 3 cm. higher than the lye outlet. The column was provided with a heating jacket through which a heating medium was circulated. The oil was heated when entering the column, the heating of the column being adjusted so that the oil left the column at a temperature of about 90° C. Crude coconut oil having a free fatty acid content of 6.2% and a lecithin content of 0.026% was passed through the column at varying throughputs. In all these cases neutralisation was almost complete, the colour without further bleaching being very good. The results are given in Table II.

Similar trials were carried out with soyabean oil which was deslimed. The free fatty acid content was 0.7%, the lecithin content 0.182%. The results are given in Table III.

Example 6

A deslimed soyabean oil miscella was prepared as a 50% solution in commercial hexane, the free fatty acid content of the oil being 0.6%. The oil was neutralised by passing the miscella through an apparatus of the kind described in Example 7 in countercurrent to 0.8 N aqueous caustic soda containing 0.3% of sodium chloride at a temperature of 50° C., the throughput of miscella being 24 kg./hr. The product had a free fatty acid content of 0.05% and the oil contained 0.09% of its weight of soap.

Example 7

Groundnut oil was neutralised in a glass column constructed on the same principle as that of FIGURE 7, with a length of 80 cm. and a diameter of 7 cm. The bed of filling material was 30 cm. in height and composed of polypropylene balls of 12 mm. diameter. The oil and alkali flowed counter-currently through the bed, the oil being in dispersed state. The alkali had a concentration of 0.4 N, the temperature was kept at 90° C. The initial free fatty acid content of the oil was 0.8%, the water content 0.11%. The specific throughput of the oil amounted to 1.3 tons/m.²/h. The final free fatty acid content was 0.10%, the water content 1.80% and the refining factor 1.28. After neutralisation the oil was immediately washed with water at a temperature of 90° C. in an apparatus of the same dimensions having the same packed bed. The neutralised oil was introduced into the lower part of the column, flowed upwards in dispersed form through the bed of balls counter-current to the water and assembled in the upper collecting zone, whence it left the column through an overflow. The amount of water was 38% of the crude oil throughput. The soap content after washing was 0.013%. (The soap content of the oil after neutralisation was 0.25%.)

Example 8

Under the same conditions as described in Example 7, groundnut oil was neutralised and washed, except that in the neutralising as well as in the washing zone the alkali and oil flowed in co-current direction towards through the packed bed, the apparatus being as shown in FIGURE 7. The initial free fatty acid content of the oil was 0.91%, the water content 0.12%. The oil throughput as well as the concentration of the alkaline solution were the same as in Example 7. After the neutralisation the final free fatty acid content of the oil was 0.08%, the water content 0.37% and the neutralisation factor 1.27. The washing was effected with water at a temperature of 90° C. in an amount of 33% of the crude oil throughout. The final soap content of the oil was 0.012% (the soap content of the oil after neutralisation was 0.17%).

Example 9

Soybean oil was neutralised and washed using an apparatus comprising a neutralising column followed by a washing column each having a packed treatment zone and constructed on the same principle as the apparatus of FIGURES 2 to 5 and 6. The temperature was kept at 80° C. in the neutralising as well as in the washing unit and the alkali concentration amounted to 0.3 N. Three charges of soybean oil were successively treated under the conditions as specified above. The amount of washing water used was 33% of the crude oil throughput.

Example 10

Neutralised soybean oil which still contained lecithin was deslimed and washed. These treatments were carried out in a glass column having a packed bed of a height of 30 cm. with ceramic balls of 10 mm. diam. at a temperature of 90° C. The height of the column was 80 cm. and the diameter was 7 cm. The oil and the aqueous solution flowed in counter-current direction, the oil being in dispersed state. The desliming agent consisted of a mixture of a 20% solution of sodium carbonate and a waterglass solution of 20° Baumé. The oil throughput was 1.5 ton/m.²/h., both in the desliming and washing operations. The neutral oil before desliming had a free fatty acid content of 0.06%, a water content of 1.04%, a soap content of 0.25% and a lecithin content of 0.08%. After the desliming and washing operation the free fatty acid content was 0.03%, the water content 0.45%, the soap content 0.05% and the lecithin content 0.04%. (The amount of desliming agent used was 10% of the oil throughput.)

Example 11

In apparatus constructed according to FIGURES 2 to 5, crude coconut oil was neutralised. The alkali concentration was 0.2 N and the temperature 90° C. The oil was introduced at the bottom of the bed and the alkali at the top under such conditions that the oil constituted the continuous phase and the alkali the disperse phase. The interface oil/alkali was above the bed. The alkali coalesced just below the packed bed and was drawn off together with the soap solution. The throughput amounted to 2 ton/m.²/h. The initial free fatty acid content of the oil was 4.5%, the water content was 0.02%. After the neutralisation the oil had a free fatty acid content of 0.15%, a water content of 0.7% and a soap content of 0.02%. The neutralising factor was 1.1.

Example 12

Under the same conditions as in Example 11 a tallow was neutralised containing 4.5% free fatty acids and a water content of 0.02%. The final free fatty acid content was 0.03%, the water content 0.64% and the soap content 0.04%.

Example 13

Under the conditions described in Example 11 soybean oil was neutralised. The initial free fatty acid content was 0.6% and the water content 0.02%. The neutral oil had a free fatty acid content of 0.10%, a water content of 0.9% and a soap content of 0.05%.

Example 14

In a column of stainless steel with a height of 125 cm. and a diameter of 10 cm., a tallow was neutralised. The height of the bed was 90 cm. and consisted of porcelain balls of 10 mm. diameter. The column was closed to the atmosphere and the neutralisation effected under a pressure of about 8.5 atm., the atmosphere being composed of nitrogen saturated with water vapour. The oil and alkaline solution flowed counter-currently, the oil being the dispersed phase. The alkaline solution had a concentration of 0.2 N and was present in an excess of 10%. The temperature during the neutralisation was kept at 150° C. The oil throughput amounted to 2.6 ton/m.²/h. The initial free fatty acid content was 4.22% and the water content 0.02%. The neutralised oil had a free fatty acid content of 0.37%, a water content of 0.9% and a soap content of 0.01%. The neutralising factor was estimated at 1.0. The water content of the oil was relatively high, which is caused by the relatively high physical solubility of water in the oil at the high processing temperatures.

Example 15

Crude palmoil was neutralised under the same conditions as described in Example 14, except that the height of the bed was 100 cm. The alkali had a concentration of 0.2 N and the temperature was 140° C. The oil throughput amounted to 2.6 ton/m.²/h. The initial free fatty acid content was 4.26% and the water content 0.02%. The final free fatty acid content was 0.87%, the water content 1.2% and the soap content 0.05%. The neutralising factor was estimated at 1.2.

Example 16

Fish-oil hardened to a slip-melting point of 37° C. was neutralised as described in Example 14, with 0.2 N caustic soda at a temperature of 140° C. The oil throughput amounted to 6.4 ton/m.²/h. The initial free fatty acid content was 0.23% and the water content 0.06%. The final free fatty acid content was 0.07%, the water content 1.2% and the soap content less than 0.01%.

Example 17

Semi-refined cottonseed oil was neutralised as described in Example 14 with 0.4 N caustic soda at a temperature of 130° C. The oil throughput amounted to 5.3 ton/m.²/h. The initial free fatty acid content was 0.26% and the water content 0.10%. The final free fatty acid content was 0.05%, the water content 0.9% and the soap content 0.07%. The initial and final lecithin content of the oil was below 0.05%.

Example 18

Deslimed crude soybean oil was neutralised as described in Example 14, with 0.4 N caustic soda at a temperature of 130° C. The oil throughput was 3.0 ton/m.²/h. The initial free fatty acid content was 0.34% and the water content 0.15%. The final free fatty acid content was 0.05%, the water content 1.0% and the soap content 0.045%. The initial lecithin content was about 0.5% and the final lecithin content about 0.15%.

TABLE I

| No. of layers of beads | No. of beads | Amount of lye in the column, ml. | Fore-run, kg.[1] | FFA, Percent | Soap, Percent | Iodine scale number |
|---|---|---|---|---|---|---|
| 0 | 0 | 1,540 | 2.6 | 2.4 | 0.01 | 14 |
| 2 | 100 | 1,500 | 2.5 | 2.0 | 0.01 | 13 |
| 8 | 410 | 1,370 | 2.3 | 0.07 | 0.01 | 9 |
| 20 | 1,040 | 1,000 | 1.8 | 0.28 | 0.01 | 7 |
| 30 | 1,560 | 880 | 1.5 | 0.10 | 0.01 | 6 |

[1] Amount of oil which passed the column before samples were taken after every charge of the height of the beads column.

TABLE II

| Batch No. | Through-put, kg./h. | Average temp., °C. | Final f.f.a. content | Percent soap | Lovibond 5¼" cel | |
|---|---|---|---|---|---|---|
| | | | | | Yellow | Red |
| 1 | 2.32 | 90 | 0.05 | 0.02 | 33.0 | 3.3 |
| 2 | 5.5 | 88 | 0.05 | 0.03 | 31.0 | 2.7 |
| 3 | 6.7 | 81 | 0.05 | 0.03 | 31.0 | 2.7 |
| 4 | 1.56 | 94 | 0.03 | Abs. | 21.0 | 2.0 |
| 5 | 2.67 | 89 | 0.03 | Abs. | 21.0 | 2.0 |
| 6 | 2.17 | 90 | 0.07 | Abs. | 21.0 | 2.0 |

TABLE III

| Batch No. | Through-put, kg./h. | Average temp., °C. | Final f.f.a. content | Percent soap | Lovibond 5¼" cel | | | |
|---|---|---|---|---|---|---|---|---|
| | | | | | Before bleaching | | After bleaching with 2% tonsil | |
| | | | | | Y | R | Y | R |
| 7 | 1.74 | 95 | 0.08 | 0.01 | 60.0 | 9.0 | | |
| 8 | 0.8 | 91 | 0.08 | 0.01 | 60.0 | 9.0 | | |
| 9 | 2.8 | 92 | 0.28 | 0.02 | 30.0 | 7.1 | 11.0 | 1.1 |
| 10 | 2.52 | 91 | 0.05 | 0.01 | 30.0 | 9.1 | 10.0 | 1.0 |
| 11 | 4.47 | 92 | 0.05 | Abs. | 30.0 | 7.1 | 10.0 | 0.5 |
| 12 | 16.15 | 92 | 0.06 | Abs. | 30.0 | 7.1 | 11.0 | 1.0 |
| 13 | 6.84 | 92 | 0.09 | 0.01 | 32.0 | 9.0 | 10.0 | 1.0 |
| 14 | 10.83 | 91 | 0.10 | Abs. | 30.0 | 7.3 | 10.0 | 1.0 |
| 15 | 8.2 | 91 | 0.05 | <0.01 | 38.0 | 8.8 | 10.0 | 1.0 |
| 16 | 3.36 | 90 | 0.07 | <0.01 | 33.0 | 9.0 | 10.0 | 1.0 |

What is claimed is:

1. In a liquid phase process for refining glyceride oils wherein the oil in liquid form is contacted with an aqueous liquid treating agent under conditions providing numerous interfaces between the two liquids and the contaminants are extracted by the aqueous liquid at said interfaces, the improvement comprising the steps of separately preheating the oil and the aqueous liquid to a temperature not less than 60° C. and not greater than 160° C. under a pressure above the saturated vapor pressure of water at the temperature of treatment, continuously introducing the heated liquids into a bed of chemically inert packing material of uniform depth, the bed having a free space amounting to 30–90% of its volume, causing the liquids to make random contact with each other while flowing along tortuous paths through said bed, and subsequently substantially separating the oil and aqueous liquids.

2. Process according to claim 1, wherein the oil passes upwards through the bed into an unpacked space and forms a pool on the surface of the aqueous phase, the lower surface of said pool being at or near the upper surface of the bed, and is continuously withdrawn from said pool.

3. A liquid phase process for at least partially neutralizing edible glyceride oils, of the kind in which the oil in liquid conditions is treated with an aqueous alkaline liquid of normality 0.5 to 2.0 under conditions providing numerous interfaces between the two liquids and contaminants are extracted by the aqueous liquid at said interfaces and removed in solution, wherein the oil and the aqueous liquid are separately preheated and the treatment is effected continuously at a temperature not less than 60° C. and not greater than 160° C. under a pressure above the saturated vapor pressure of water at the temperature of treatment, in a bed of chemically inert packing material of uniform depth and having a free space amounting to 30% to 90% of its volume, said bed being supported in a confined space extending above and below the bed and the treatment comprising substantially filling the bed with the aqueous liquid, continuously introducing the oil at points distributed over the horizontal cross-section of the bed at or near the bottom thereof, allowing it to flow up through the bed to form a pool on the upper surface of the aqueous liquid therein, said surface being at or near the top of the bed and continuously removing it from said pool while introducing fresh alkaline liquid at points distributed over a horizontal cross-section of the bed at or near the top thereof but above the lower surface of said pool, allowing said liquid to flow downwards through the bed and continuously removing it from the space below the bed, the amount of alkaline liquid being greater than that theoretically required to neutralize the oil completely and both oil and alkaline liquid being free from occluded or dissolved gases or floating impurities, and substantially all the neutralization effected occurring during passage through the bed.

4. Process according to claim 3, wherein the upper surface of the continuous aqueous phase is above the bed, and the oil is introduced at a level below the bed.

5. Process according to claim 1 for washing neutralized oil to remove soap therefrom, wherein the treating liquid is a solution of sodium chloride of concentration 0.1% to 1.5% by weight.

6. Process according to claim 1 for desliming a neutralized oil wherein the treating agent is an aqueous desliming agent which is a solution of sodium silicate.

7. Process according to claim 1, wherein the treatment is carried out under superatmospheric pressure at a temperature above the normal boiling point of water.

8. Process according to claim 3 for at least partly neutralizing an edible oil, in which fatty acids having at least 16 carbon atoms predominate, wherein the treating agent is an aqueous solution of sodium hydroxide of normality 0.1 to 1.2 and the treatment is carried out above 100° C.

9. Process according to claim 8, wherein the predominating fatty acids contain olefinic bonds and the reaction temperature is 100° to 130° C.

10. Process according to claim 8, wherein the predominating fatty acids are saturated and the reaction temperature is at least 130° C.

References Cited

UNITED STATES PATENTS 2,183,486  12/1939  Colbeth ____________ 260—425

NICHOLAS S. RIZZO, Primary Examiner.

A. M. TIGHE, Assistant Examiner.

U.S. Cl. X.R.

260—424, 425